United States Patent
Peng et al.

(10) Patent No.: US 8,233,419 B2
(45) Date of Patent: Jul. 31, 2012

(54) UPLINK POWER CONTROL DEVICE AND METHOD

(75) Inventors: Focai Peng, Shenzhen (CN); Cuihong Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 446 days.

(21) Appl. No.: 12/525,399

(22) PCT Filed: Dec. 28, 2007

(86) PCT No.: PCT/CN2007/003868
§ 371 (c)(1),
(2), (4) Date: Jul. 31, 2009

(87) PCT Pub. No.: WO2008/095378
PCT Pub. Date: Aug. 14, 2008

(65) Prior Publication Data
US 2010/0002616 A1      Jan. 7, 2010

(30) Foreign Application Priority Data
Feb. 2, 2007   (CN) .......................... 2007 1 0003338

(51) Int. Cl.
G08C 17/00     (2006.01)
H04W 4/00      (2009.01)
(52) U.S. Cl. .................. 370/311; 370/328; 370/329
(58) Field of Classification Search .................. None
See application file for complete search history.

(56) References Cited

U.S. PATENT DOCUMENTS
2005/0243762 A1 * 11/2005 Terry et al. ................ 370/328

FOREIGN PATENT DOCUMENTS
| CN | 1509579 A | 6/2004 |
| CN | 1510848 A | 7/2004 |
| CN | 1732639 A | 2/2006 |
| CN | 100512050 C | 2/2006 |

OTHER PUBLICATIONS

3GPP TS 25.214 V7.3.0 (Dec. 2006)Technical Specification 3rd Generation Partnership Project; Technical Specification Group Radio Access Network; Physical layer procedures (FDD) (Release 7).*

* cited by examiner

Primary Examiner — Faruk Hamza
Assistant Examiner — Diane Lo
(74) Attorney, Agent, or Firm — Kunzler Law Group

(57) ABSTRACT

An uplink power control device and method, which uses power control technology for E-DCH channel in HSPA+ system, wherein, the user equipment reads TPC from Node B in the latest several time slots, the current transmission power of uplink channels and the modulation mode of E-DPDCH channel in next TTI; then selects a method for power control according to the modulation method of E-DPDCH channel in next TTI; calculates the transmission power of uplink channel used in next TTI according to the TPC received in the latest several time slots, the current transmission power, requirements for maximal transmission power and minimal transmission power, power control adjustment step and β factor corresponding to DPCCH of uplink channel; finally keeps the transmission powers of all or some of uplink channels constant in the whole TTI of E-DPDCH. The device and method can decrease crosstalk between I branch and Q branch signals.

18 Claims, 11 Drawing Sheets

UPLINK POWER CONTROL DEVICE AND METHOD

TECHNICAL FIELD

The present invention relates to power control technology in the Wideband Code Division Multiple Access (WCDMA) mobile communication system, and more specifically, to a power control device and method for Enhanced Dedicated Channel (E-DCH) in the High Speed Packet Access Evolution (HSPA+) system.

BACKGROUND

According to RP-060844 ("Proposed WID for Higher Order Modulation in HSUPA) of the 3$^{rd}$ Generation Partnership Project (3GPP), HSPA+ will add a new high order modulation-16-order Quadrature Amplitude Modulation (16QAM) in E-DCH.

As shown in FIG. 1, 16QAM will be equivalently implemented by multiplexing a pair of the 4 Pulse-Amplitude Modulation (4PAM) on the quadrature phase (Q branch) and the 4PAM oN the in-phase (I branch) according to the R1-070590 ("DRAFT Introduction of 16QAM for HSUPA") of 3GPP.

As shown in FIG. 2, according to the section 5.2.1.1 of 3GPP TS 25.211 V7.0.0, the user equipment (UE) should specify the number of the bits of dedicated pilot, Transport Format Combination Indicator (TFCI), Feed Back Information (FBI), Transmission Power Control (TPC) of Dedicated Physical Control Channel (DPCCH).

As shown in FIG. 3, if there is no simultaneous Dedicated Physical Data Channel (DPDCH) and FBI when the UE using the E-DCH, DPCCH will use the transmission mode of "8 Pilot bits and 2 TPC bits" (in the following description, it is the transmission mode of "8 Pilot bits and 2 TPC bits" used unless otherwise specified.)

According to the section 5.1.2 of 3GPP TS 25.214 V7.3.0, the UE controls the transmission power of DPCCH, for example, the method of 1500 Hz power control or the method of the 5 time slots combined 300 Hz power control is performed at each time slot. According to section 5.1.2.5B.2 of 3GPP TS 25.214 V7.3.0, the UE controls the transmission power of Enhanced Dedicated Physical Data Channel (E-DPDCH), and the method would be to set the power offset between E-DPDCH and DPCCH.

Suppose the modulation of E-DPDCH in a certain 2 ms-Transmission Time Interval (TTI) is Binary Phase Shift Keying (BPSK), the power of E-DPDCH in the 2 ms-TTI might be different in each time slot, for example, if the 1500 Hz fast power control were applied, each control should use 1 dB for control granularity.

Suppose the modulation scheme of E-DPDCH in a certain 2 ms-Transmission Time Interval (TTI) is 4PAM (I/Q multiplexed to be equivalent to 16QAM), the power of E-DPDCH in the 2 ms-TTI should be as constant as possible so as to make the received data reliable. The advantage of keeping the power of E-DPDCH constant is that, the channel estimation at a base station (Node B) in fields except pilot of DPCCH could fully make use of the channel estimation in the pilot field of the next time slot, as shown in FIG. 4.

On the contrary, if the transmission power in each time slot of the 2 ms-TTI is variable (increasing or decreasing a power control order) when 4PAM data (I/Q multiplexed to be equivalent to 16QAM) is transmitted in E-DPDCH, an error occurs easily in channel estimation during TPC time, and the channel estimation in the whole TTI is inconsistent, as shown in FIG. 5.

In a practical channel condition, due to multipath, Doppler shift, or interference due to other radio devices, the originally orthogonal I branch signal and Q branch signal sent by the UE are not orthogonal anymore at receiver of Node B, and there is crosstalk.

For example, suppose the transmitted signal is shown as FIG. 6, the signal received in the practical channel condition is shown as FIG. 7, wherein the received I branch signal is shown as FIG. 8, and the received Q branch signal is shown as FIG. 9. From FIG. 7 to FIG. 9, it can be seen that there is symbol misjudgment at the receiving terminal.

SUMMARY OF THE INVENTION

The present invention offers an uplink power control device and method to reduce crosstalk between the I branch signal and Q branch signal in HSPA+system and to make the HSPA+system better support 4PAM (I/Q multiplexed to be equivalent to 16QAM) or higher order modulation technology (such as 8PAM), and to be compatible with and enhance the present High Speed Uplink Packet Access (HSUPA).

In order to solve the above problem, the present invention offers an uplink power control method in HSPA+system, and the method comprises:

(1) a UE reads the modulation scheme of E-DPDCH in TTI;

(2) the UE selects the method for power control according to the modulation scheme of E-DPDCH, if it is BPSK, the procedure goes to step (3); otherwise, if it is 4PAM, 8PAM or higher order modulation, the procedure goes to step (4);

(3) the UE selects power control algorithm according to the 3GPP release supported by itself, if it supports 3GPP Release 7 or later release, the process proceeds to step (4); otherwise, it controls the transmission power according to the method specified in the TS25.214 of 3GPP Release 99/5/6, then the whole procedure ends;

(4) said UE keeps the transmission power of all or some of uplink channels in the whole TTI of E-DPDCH constant.

Furthermore, in said step (1), said UE reads the TPC from Node B in latest several time slots and the current transmission power of the uplink channel. Said TPC includes TPC of DPCCH or F-DPCH sent by Node B. In said step (1), the value range of said TPC is the set of {0, 1}, and said TPC picks up either one as its value.

Furthermore, in said step (4), the UE calculates the transmission power of the uplink channel used in the next TTI according to the TPC received in the latest several time slots, the current transmission power, the requirements for the maximal transmission power and minimal transmission power, the power control step, the power offset factor β relative to DPCCH of the uplink channel, and then keeps the transmission powers of all or some uplink channels constant.

Furthermore, said step (4) specifically comprises:

(41) said UE calculates the combined transmission power control command $TPC_{Adj}$ according to the TPC read from Node B in the latest several time slots;

(42) said UE calculates the transmission power of the uplink channel according to the current transmission power, the power control step Δ, the combined transmission power control command $TPC_{Adj}$ of the uplink channel and the power offset factor β of the uplink channel relative to DPCCH;

(43) the UE checks if the transmission power of uplink channel is in the range allowed by each channel or not, that is, it meets requirement of minimal transmission power by each channel and meanwhile does not surpass the maximal transmission power of each channel; if it exceeds the range of transmission power allowed by each channel, the UE will adjust the transmission power to be within the range allowed by each channel;

(44) said UE checks if the total transmission power of the uplink channels exceeds the maximal transmission power of the UE or not; if yes, it adjusts the transmission powers of uplink channels so that the total transmission power of uplink channels does not exceed the maximal transmission power of the UE.

Furthermore, in said step (41), if the UE supports 3GPP Release 7 or later, it calculates the combined transmission power control command TPC$_{Adj}$ according to the following equations:

$$TPC_{Com} = TPC1 + TPC2 + TPC3 + \ldots + TPCn \quad \text{(Eqn. A)}$$

$$TPC_{Dec} = \begin{cases} 0, & \text{if } TPC_{Com} < 2 \\ 1, & \text{else} \end{cases} \quad \text{(Eqn. B)}$$

$$TPC_{Adj} = 2 \cdot TPC_{Dec} - 1 \quad \text{(Eqn. C)}$$

wherein, said TPC1, TPC2, TPC3, ... TPCn are respectively the TPC commands in the latest n time slots.

Furthermore, in said step (41), if the modulation of E-DPDCH in the next TTI is 4PAM, 8PAM or higher order modulation, said UE calculates the combined transmission power control command TPC$_{Adj}$ according to the following equation:

$$TPC_{Adj} = TPC1 + TPC2 + \ldots + TPCn-1 \quad \text{(Eqn. D)}$$

wherein, said TPC1, TPC2, TPC3, ... TPCn are respectively the TPC commands in the latest n time slots.

Furthermore, in said step (42), the transmission power of uplink channel is calculated according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein P$_{DPCCH}$ in Eqn. E is the current transmission power of DPCCH, Δ is the power control adjustment step; P$_{other}$ in Eqn. F is the transmission power of other uplink channel except this DPCCH, β$_c$ and β$_{other}$ respectively are the power offset factor of DPCCH and the power offset factor of other uplink channel except this DPCCH relative to DPCCH.

Furthermore, in said step (44), said UE adjusts the transmission power of the uplink channel linearly and proportionately.

The present invention also offers an uplink power control device in HSPA+ system, and the device comprises:

a module for reading TPC used to read TPC from Node B in the latest several time slots;

a module for reading current transmission power of uplink channel used to read the current transmission power of uplink channel of the UE;

a module for reading E-DPDCH modulation used to read the modulation mode of E-DPDCH in a TTI;

a module for reading 3GPP release supported by UE used to read the 3GPP release supported by the UE;

a module for reading requirements of maximal and minimal transmission powers, power control adjustment step and power offset factor used to read the requirements of the maximal and minimal transmission powers, power control adjustment step and power offset factor β relative to DPCCH of the uplink channel;

a module for calculating uplink channel transmission power used to calculate the transmission power of each uplink channel according to the read TPC, the current transmission power, the requirements of maximal and minimal transmission powers, the power control adjustment step and the power offset factor β relative to DPCCH of the uplink channel;

a module for setting uplink channel transmission power used to check the transmission power of each uplink channel and adjust the transmission power exceeding the range allowed by each channel to be within the allowed range, check the total transmission power of uplink channels, and linearly adjust the transmission power of each uplink channel if the total transmission powers exceeds the maximal transmission power of the UE.

Furthermore, the module for reading TPC reads TPC from DPCCH or F-DPCH sent by Node B.

Furthermore, if the UE supports 3GPP Release 7 or later, the module for calculating uplink channel transmission power calculates the combined transmission power control command TPC$_{Adj}$ according to the following equations:

$$TPC_{Com} = TPC1 + TPC2 + TPC3 + \ldots + TPCn \quad \text{(Eqn. A)}$$

$$TPC_{Dec} = \begin{cases} 0, & \text{if } TPC_{Com} < 2 \\ 1, & \text{else} \end{cases} \quad \text{(Eqn. B)}$$

$$TPC_{Adj} = 2 \cdot TPC_{Dec} - 1 \quad \text{(Eqn. C)}$$

wherein, said TPC1, TPC2, TPC3, ... TPCn are respectively the TPC commands in the latest n time slots.

Furthermore, if the modulation of the E-DPDCH is 4PAM, 8PAM or higher order modulations in the next TTI, said module for calculating uplink channel transmission power calculates the combined transmission power control command TPC$_{Adj}$ according to the following equation:

$$TPC_{Adj} = TPC1 + TPC2 + \ldots + TPCn-1 \quad \text{(Eqn. D)}$$

wherein, said TPC1, TPC2, TPC3, ... TPCn are respectively the TPC commands in the latest n time slots.

Furthermore, the module for calculating uplink channel transmission power calculates the transmission power of the uplink channel according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein P$_{DPCCH}$ in Eqn. E is the current transmission power of DPCCH, Δ is the power control step; P$_{other}$ in Eqn. F is the transmission power of other uplink channel except this DPCCH, β$_c$ and β$_{other}$ are respectively the power offset factor of DPCCH and the power offset factor of other uplink channel except this DPCCH relative to DPCCH.

With the device and method of the present invention, HSPA+ system can better support uplink 4PAM (16QAM), completely be compatible with and further improve the present system, and effectively reduce the crosstalk between I branch signal and Q branch signals, thus making HSPA+ system have larger system throughout than the legacy HSUPA system having only BPSK and smoothly upgrading the present system.

PREFERRED EMBODIMENTS OF THE PRESENT INVENTION

The uplink physical layer E-DPDCH based on 3GPP Release 7 (or later) will add high order modulation technology such as 4PAM (16QAM) or 8PAM (64QAM) to be compatible with the previous BPSK and make BPSK be still used, yet the present 3GPP has not decided how the uplink power control will be changed after using 4PAM (16QAM) or higher order modulation (such as 8PAM), and its physical layer specification has not been developed.

In order to reduce the crosstalk between I branch signals and Q branch signals, make HSPA+ system better support 4PAM (I/Q multiplexing to be equivalent to 16QAM) or higher order modulation (such as 8PAM), be compatible with and enhance the present High Speed Uplink Packet Access (HSUPA) technology (enhanced uplink technology using E-DCH), the present invention offers a power control device and method for E-DCH.

In the following, the present invention will be described in further detail in combination with the accompanying figures and the embodiments.

Figure 1:
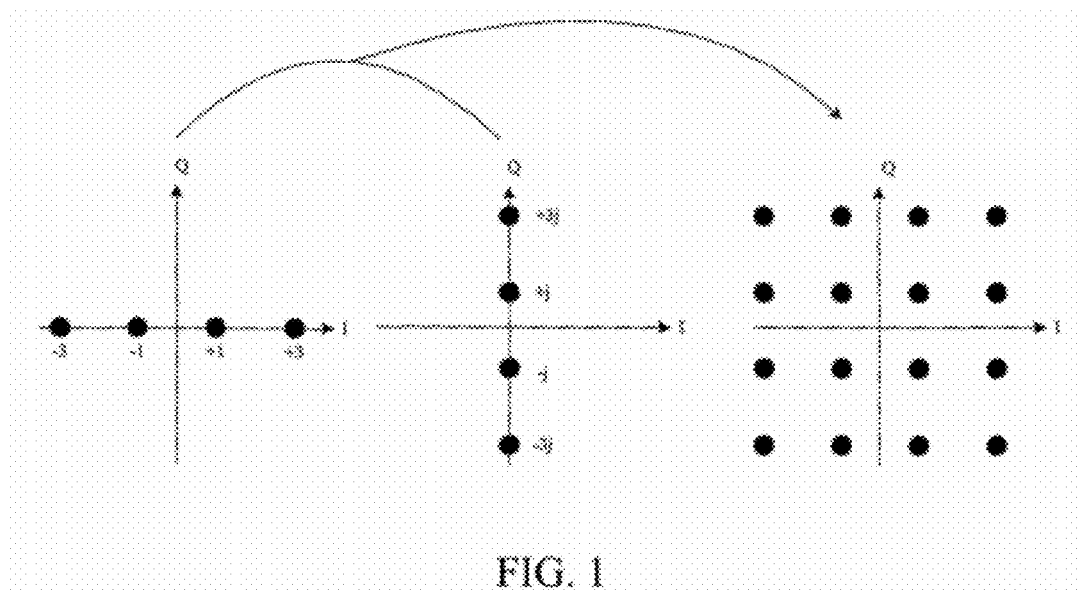
FIG. 1 illustrates schematically 4PAM of I/Q multiplexing to be equivalent to 16QAM.
Figure 2:
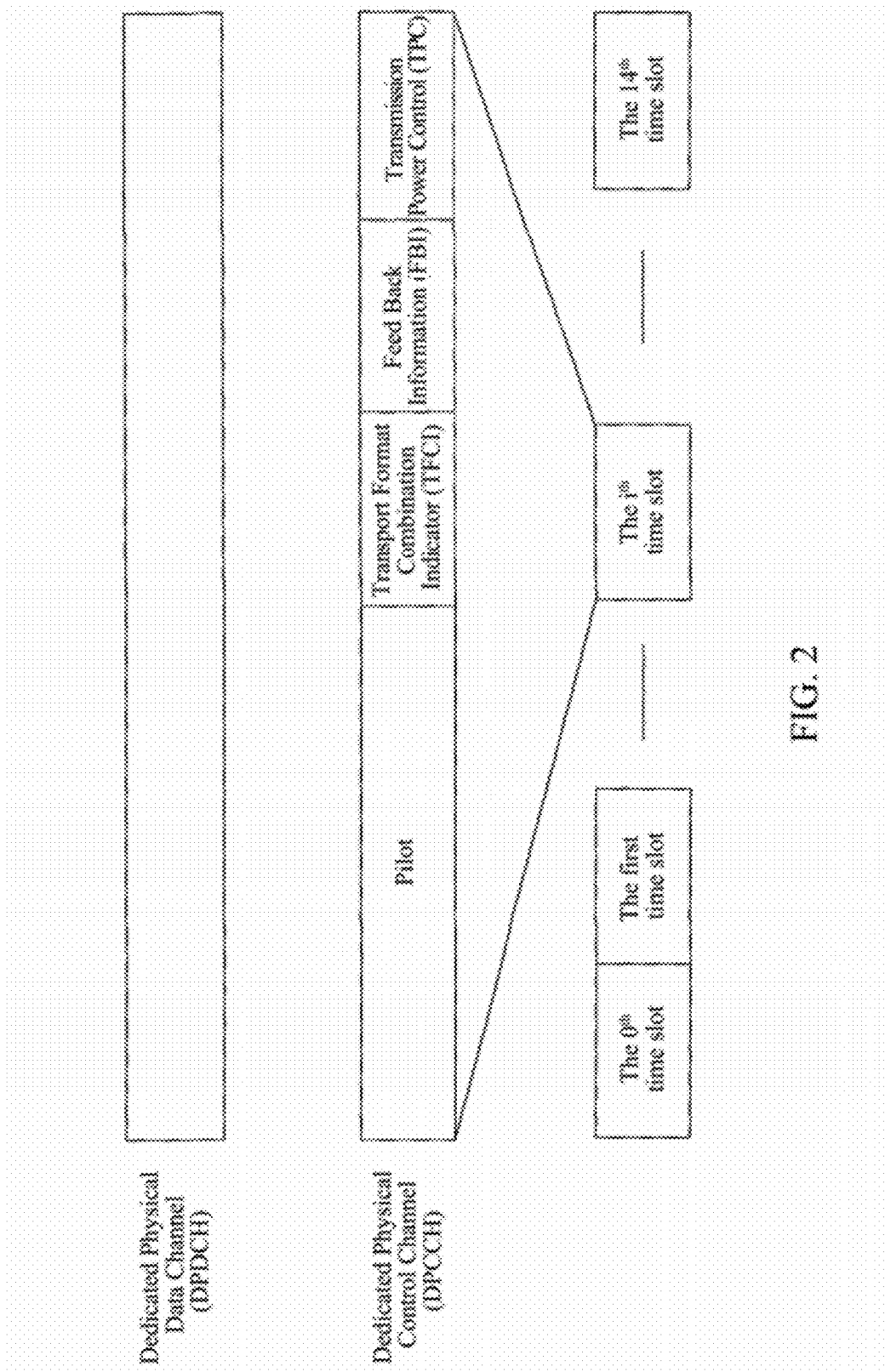
FIG. 2 illustrates schematically the frame structure of DPCCH.
Figure 3:
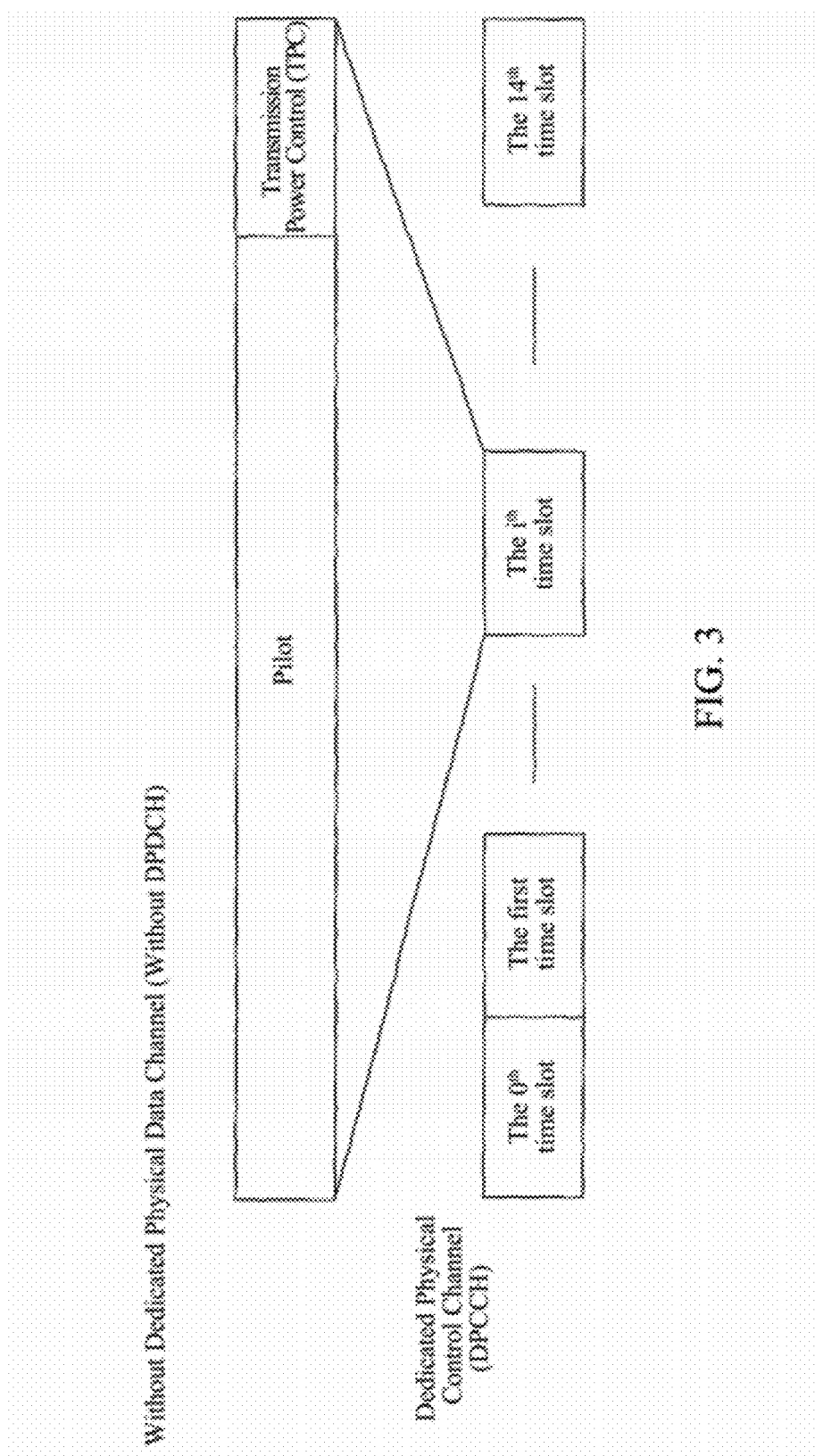
FIG. 3 illustrates schematically the frame structure of DPCCH using 8-bit pilot and 2-bit TPC.
Figure 4:
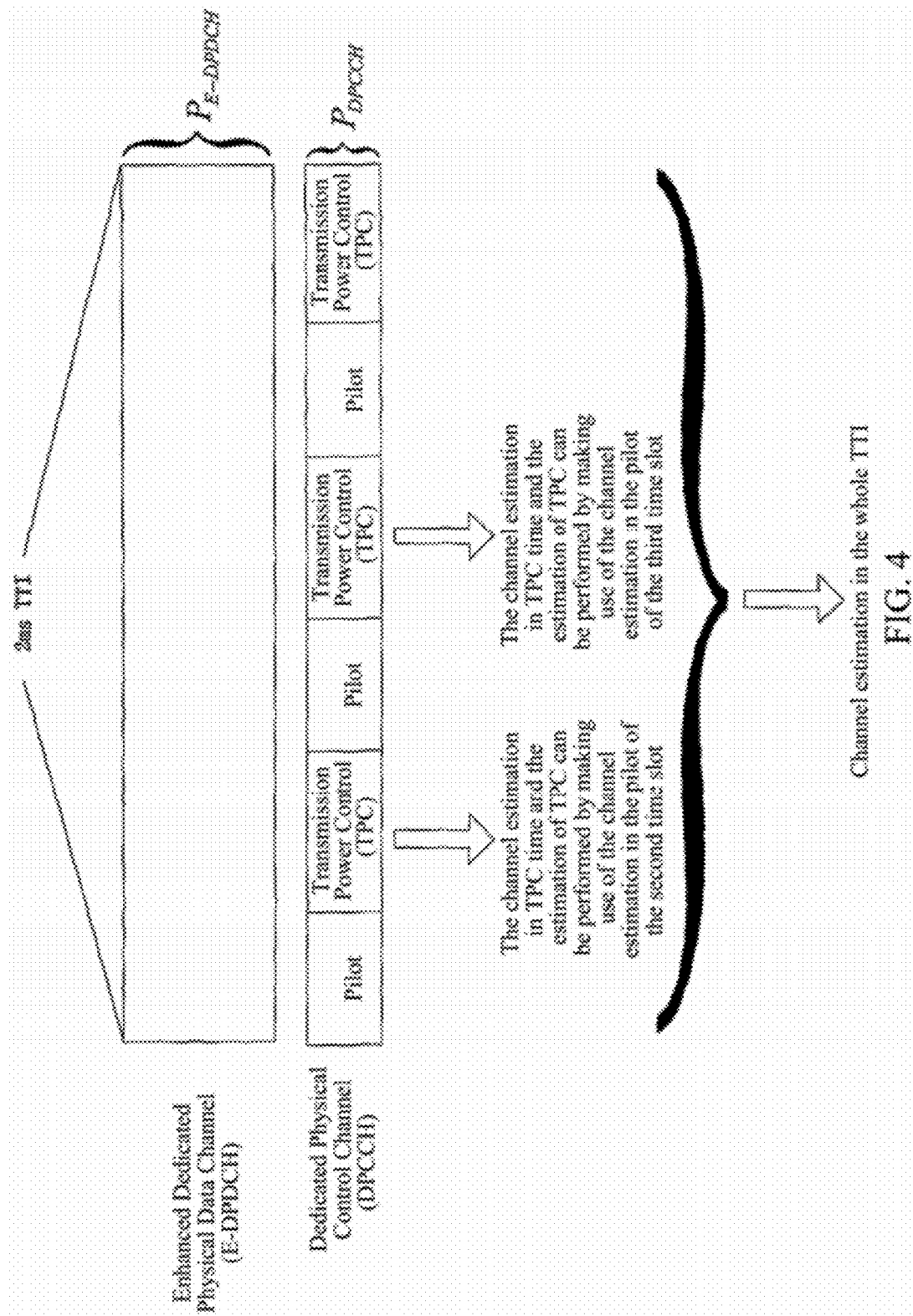
FIG. 4 is a schematic illustration that the transmission power of uplink DPCCH and E-DPDCH in a TTI of E-DPDCH is constant.
Figure 5:
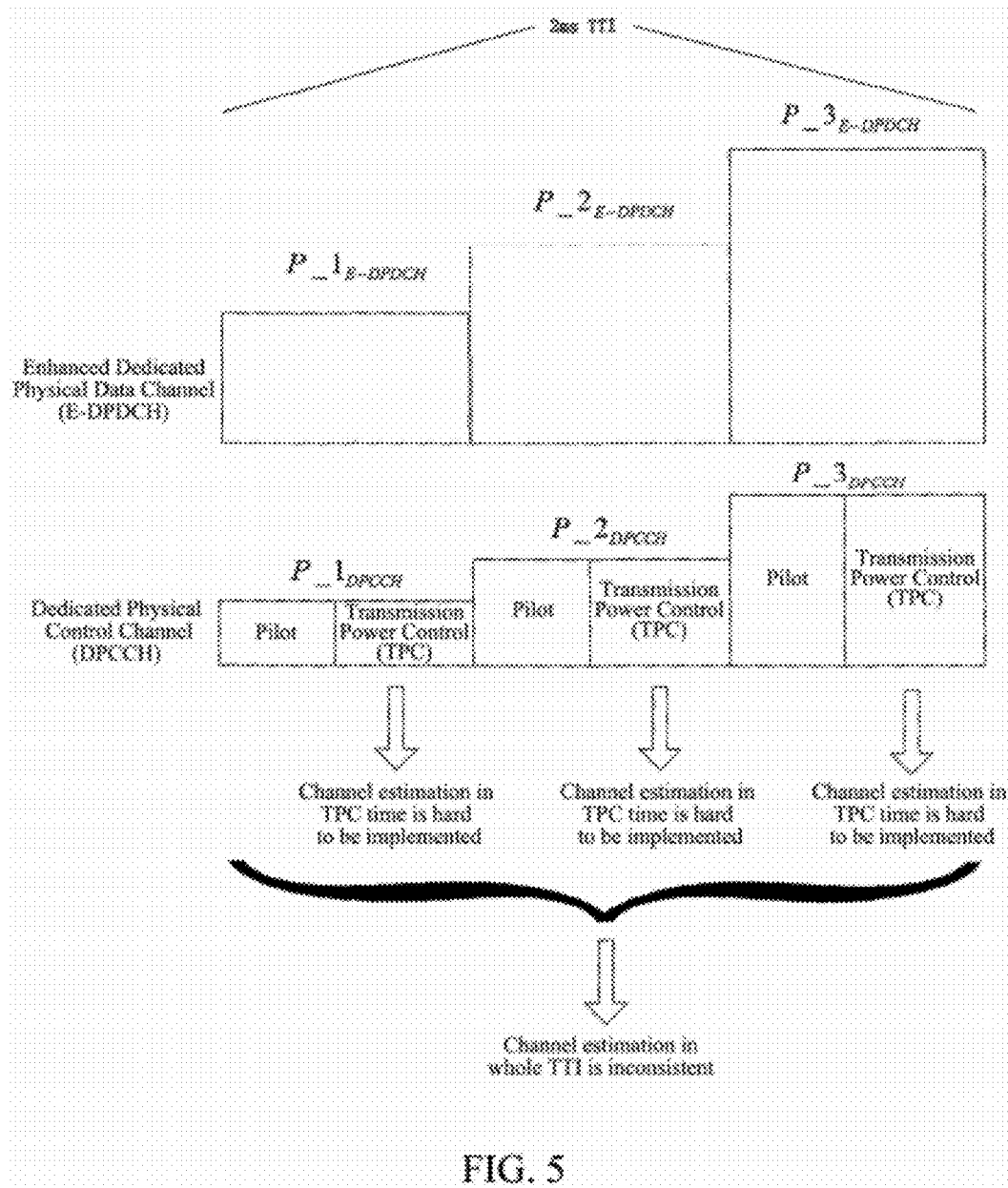
FIG. 5 is a schematic illustration that the transmission power of uplink DPCCH and E-DPDCH in a TTI of E-DPDCH is variable.
Figure 6:
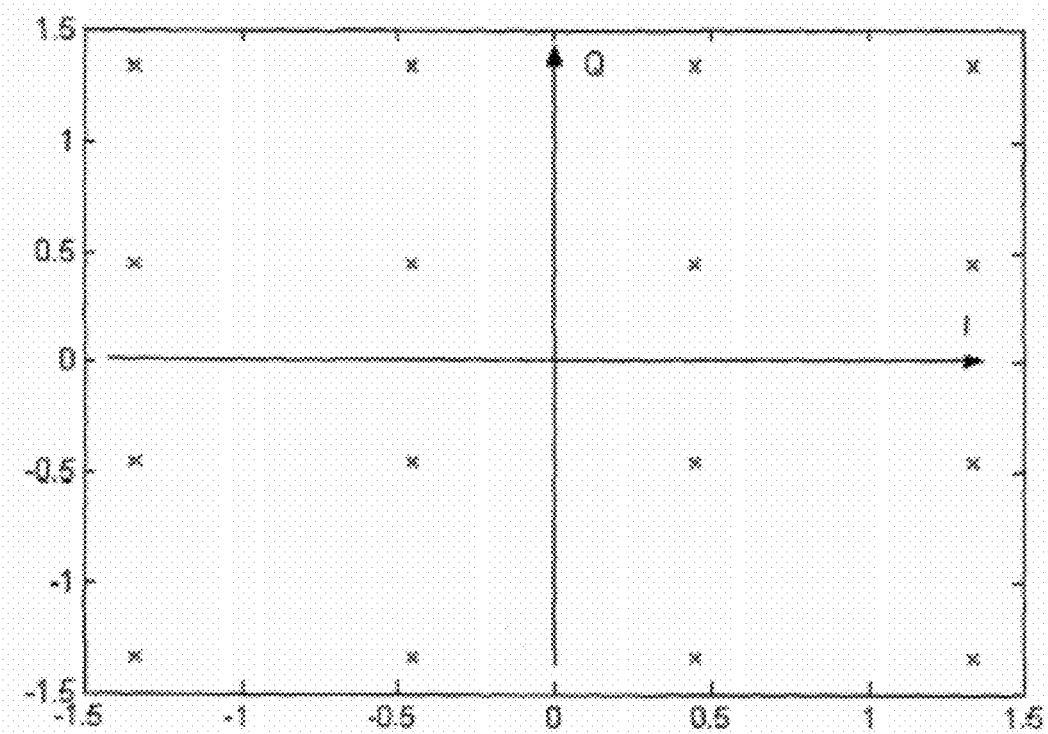
FIG. 6 is a constellation of 4PAM signals of I/Q multiplexing transmitted in E-DPDCH.
Figure 7:
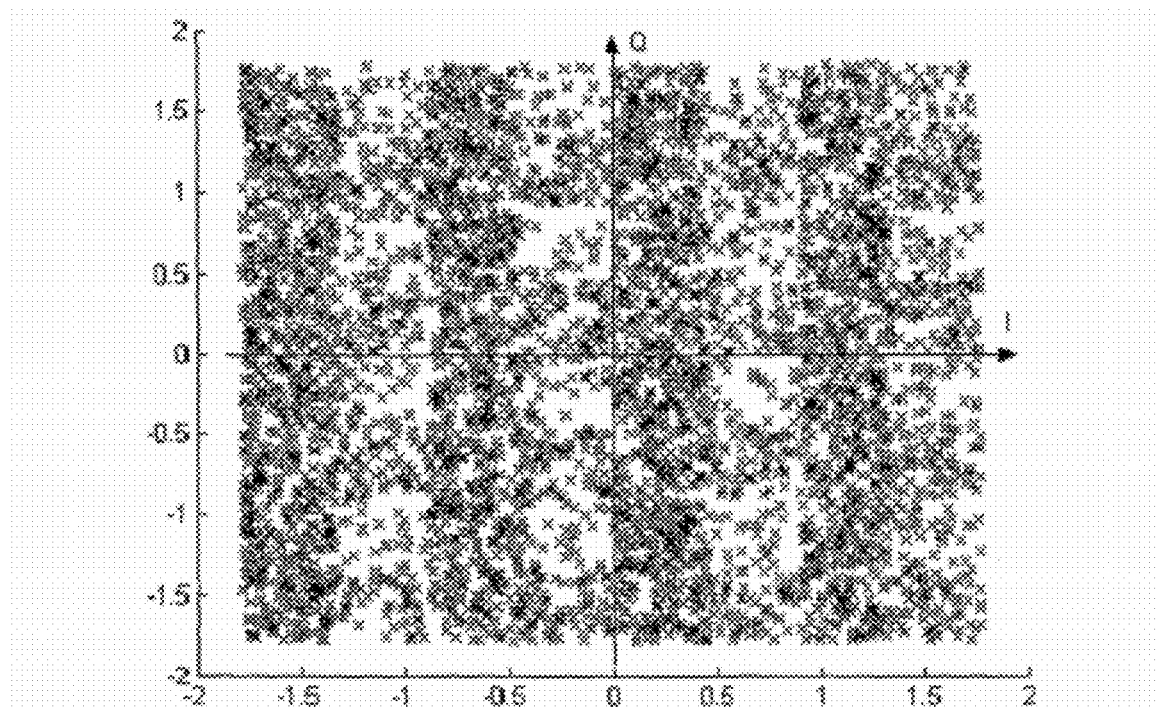
FIG. 7 is a schematic constellation of the signals received by Node B from E-DPDCH after the signals in FIG. 6 are sent out.
Figure 8:
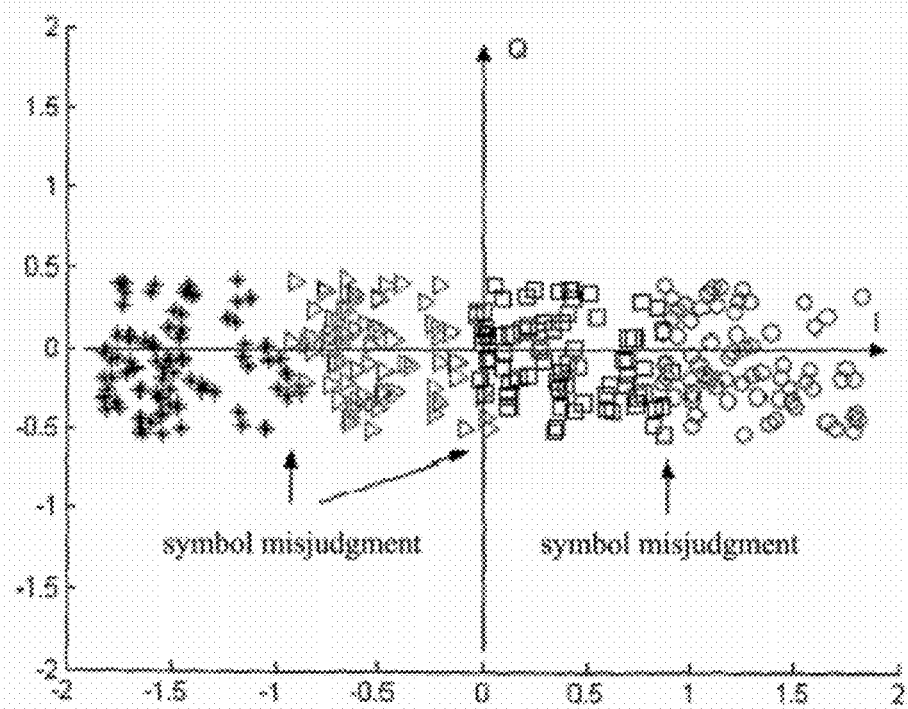
FIG. 8 illustrates schematically I branch signal of E-DPDCH received by Node B when E-DPDCH transmits 4PAM signals of I/Q multiplexing (having Q branch crosstalk)
Figure 9:
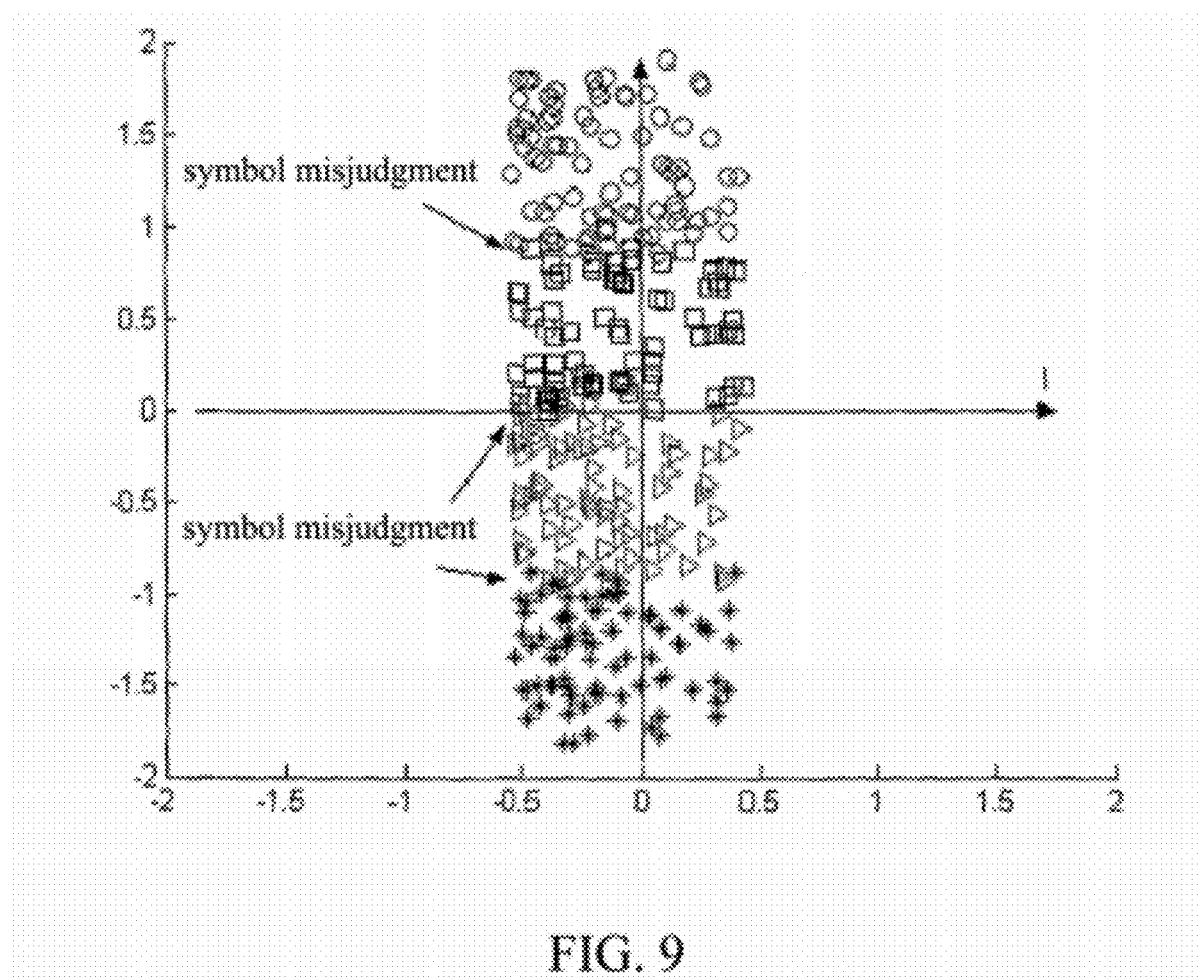
FIG. 9 illustrates schematically Q branch signal of E-DPDCH received by Node B when E-DPDCH transmits 4PAM signals of I/Q multiplexing (having I branch crosstalk)
Figure 10:
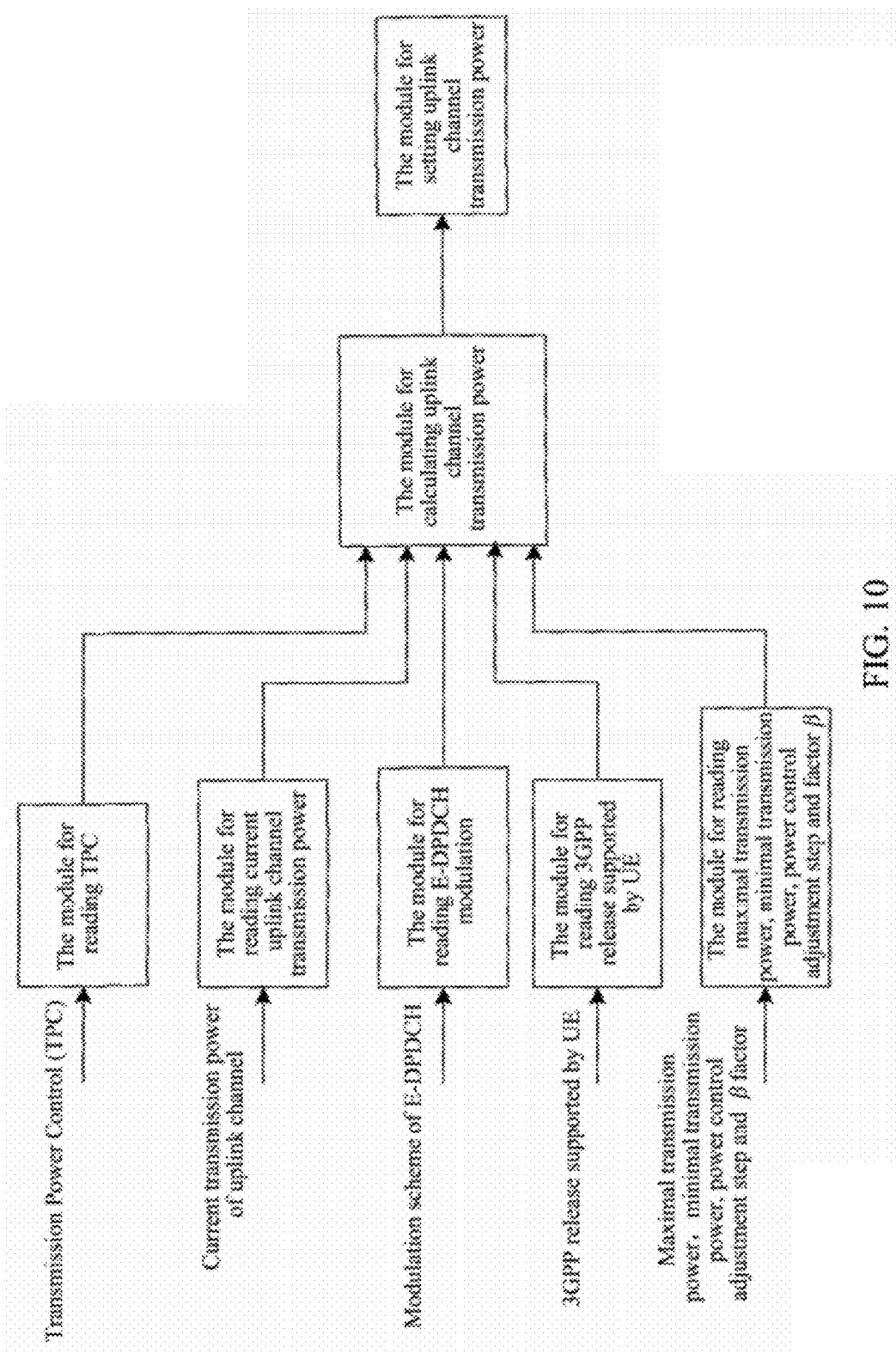
FIG. 10 illustrates schematically the structure of an embodiment of the device in accordance with the present invention.

The present invention offers an uplink power control device for HSPA+ system, as shown in FIG. 10, and the device comprises:

a module for reading TPC used to read the TPC commands from Node B in the latest several time slots, wherein the TPC can be from DPCCH or Fractional Dedicated Physical Channel (F-DPCH) sent by Node B;

a module for reading present uplink channel transmission power used to read the current transmission power of each uplink channel of the UE, wherein, the uplink channel might be DPCCH, E-DPDCH, Enhanced Dedicated Physical Control Channel (E-DPCCH) and Dedicated Physical Control Channel (uplink) for HS-DSCH (HS-DPCCH), etc;

a module for reading E-DPDCH modulation used to read the modulation mode of E-DPDCH;

a module for reading 3GPP release supported by UE used to read the release of the 3GPP supported by the UE;

a module for reading requirements of maximal and minimal transmission powers, power control adjustment step and power offset factor used to read the requirements of maximal and minimal transmission powers, the power control adjustment step and the power offset factor $\beta$ relative to DPCCH of each uplink channel;

a module for calculating uplink channel transmission power used to calculate the transmission power of each uplink channel according to the read TPC, the current transmission power, the requirements of maximal and minimal transmission powers, the power control adjustment step, and the power offset factor $\beta$ relative to DPCCH of each uplink channel.

If the UE supports 3GPP Release 7 or later, the module for calculating uplink channel transmission power calculates the combined transmission power control command $TPC_{Adj}$ according to the following equations:

$$TPC_{Com} = TPC1 + TPC2 + TPC3 + \ldots + TPCn \quad \text{(Eqn. A)}$$

$$TPC_{Dec} = \begin{cases} 0, & \text{if } TPC_{Com} < 2 \\ 1, & \text{else} \end{cases} \quad \text{(Eqn. B)}$$

$$TPC_{Adj} = 2 \cdot TPC_{Dec} - 1 \quad \text{(Eqn. C)}$$

wherein, said TPC1, TPC2, TPC3, ... TPCn are respectively the TPC commands in the latest n time slots.

If the modulation of E-DPDCH of the UE in next TTI is 4PAM, 8PAM or higher order modulation, said module for calculating uplink channel transmission power calculates the combined transmission power control command $TPC_{Adj}$ according to the following equation:

$$TPC_{Adj} = TPC1 + TPC2 + \ldots + TPCn - 1 \quad \text{(Eqn. D)}$$

wherein, said TPC1, TPC2, TPC3, ... TPCn are respectively the TPC commands in the latest n time slots.

Furthermore, the module for calculating uplink channel transmission power calculates the transmission power of the uplink channel according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein $P_{DPCCH}$ in Eqn. E is the current transmission power of uplink DPCCH, $\Delta$ is the power control step; $P_{other}$ in Eqn. F is the transmission power of other uplink channel except this DPCCH, $\beta_c$ and $\beta_{other}$ are respectively the power offset factor of the DPCCH and the power offset factor of other uplink channel except this DPCCH relative to DPCCH.

a module for setting uplink channel transmission power used to set the transmission power of each uplink channel, check the transmission power of each uplink channel and adjust the transmission power exceeding the range allowed by each channel to be within the allowed range; check the total transmission power of uplink channels, and linearly adjust the transmission power of each uplink channel if the total transmission power exceeds the maximal transmission power of the UE.

Figure 11:
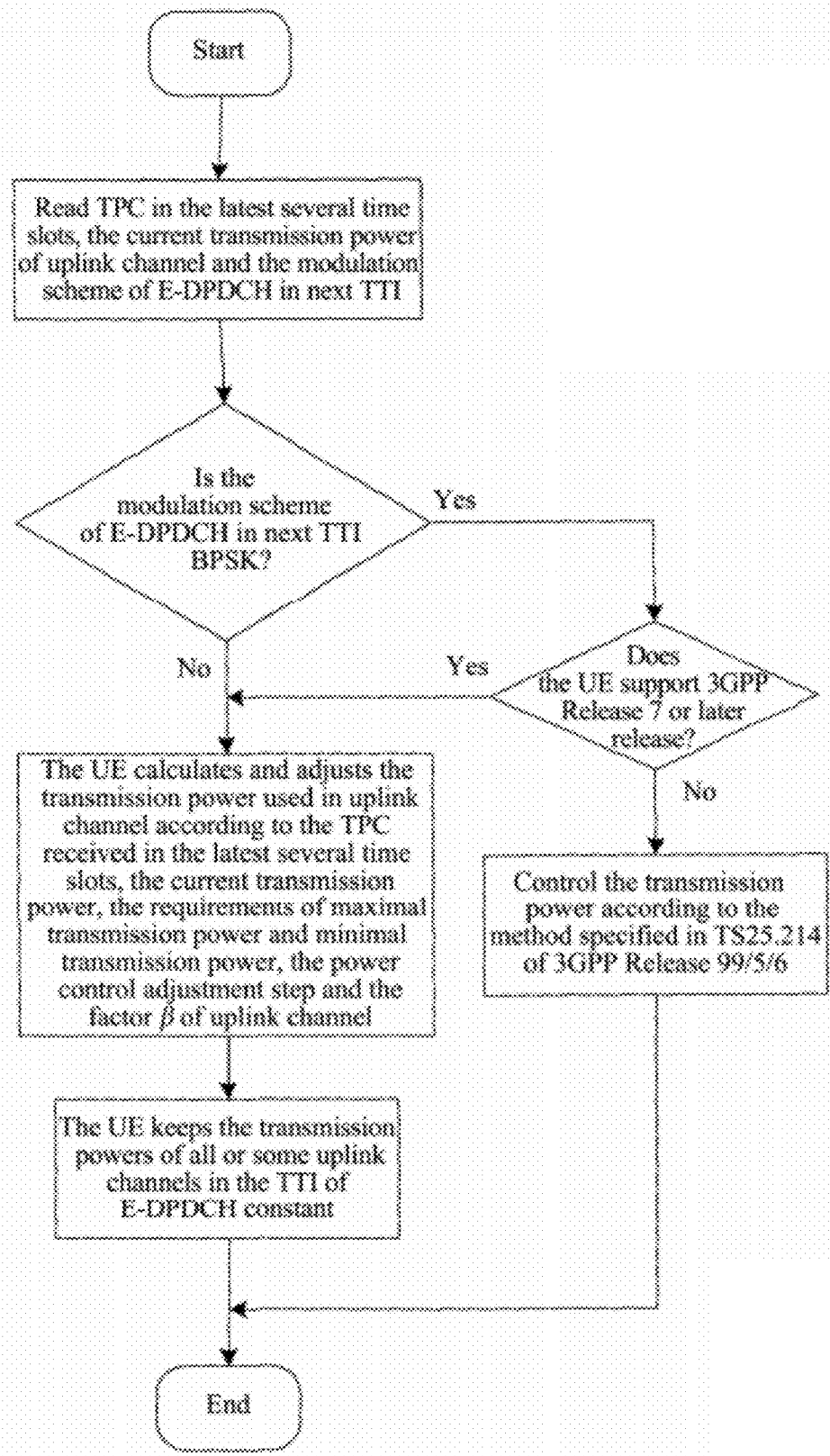
FIG. 11 illustrates schematically the flow of an embodiment of the method in accordance with the present invention.

The present invention further offers an uplink power control method for HSPA+ system, as shown in FIG. 11, and the method comprises the following steps:

Step 1: the UE reads TPC from Node B in the latest several time slots, the current transmission power of uplink channel and the modulation of E-DPDCH in next TTI.

Where, the TPC can be from DPCCH or F-DPCH sent by Node B. Suppose the TPC in the latest $1^{st}$ time slot is TPC1, the TPC in the latest $2^{nd}$ time slot is TPC2, and so on, and the TPC in the latest $n^{th}$ time slot is TPCn, n is an integer greater than 0. The range of TPC1, TPC2, ..., TPCn is the set of {0, 1}, that is, either "0" or "1".

Where the uplink channel can be DPCCH, E-DPDCH, E-DPCCH and HS-DPCCH whose corresponding transmission powers are respectively $P_{DPCCH}$, $P_{E\_DPDCH}$, $P_{E\_DPCCH}$ and $P_{HS\_DPCCH}$. These transmission power values are linear, with a unit of mW, the value range is from 0 to the maximal transmission power of the UE. The maximal transmission power of the UE is generally 125 mW (21 dBm) or 250 mW (24 dBm), same below. Of course, the uplink channel can also be other kinds of channels besides DPCCH, E-DPDCH, E-DPCCH and HS-DPCCH.

Step 2: The UE selects the method for power control according to the modulation of E-DPDCH in the next TTI. If it is BPSK, the procedure proceeds to step 3; otherwise, if it is 4PAM or 8PAM, the procedure proceeds to step 4;

Step 3: The UE selects power control algorithm according to the release supported by itself, if it supports 3GPP Release 7 or later, the procedure proceeds to step 4; otherwise, the transmission power is controlled according to the method specified in the TS25.214 of 3GPP Release 99/5/6, then the whole procedure ends;

Step 4: Said UE calculates and adjusts the transmission power of uplink channel used in the next TTI according to the TPC received in the latest several time slots, the current transmission power, the requirements of maximal transmission power and minimal transmission power, the power control adjustment step and the power offset factor β related to DPCCH of the uplink channel.

Where, TPC comes from TPC1, TPC2, ..., TPCn in step 1.

Where, the current transmission power of uplink channel comes from the $P_{DPCCH}$, $P_{E-DPDCH}$, $P_{E-DPCCH}$ and $P_{HS-DPCCH}$ in step 1, and their corresponding maximal transmission powers are $MaxP_{DPCCH}$, $MaxP_{E\_DPDCH}$, $MaxP_{E\_DPCCH}$ and $MaxP_{HS\_DPCCH}$ whose values are linear, with a unit of mW, the value range is from 0 to the maximal transmission power of the UE; their corresponding minimal transmission powers are respectively $MinP_{DPCCH}$, $MinP_{E\_DPDCH}$, $MinP_{E\_DPCCH}$ and $MinP_{HS\_DPCCH}$, whose values are also linear, with a unit of mW, the value range is also from 0 to the maximal transmission power of the UE.

Where, the power control step is Δ in dB, log domain, same below.

Where, power offset factors β of DPCCH, E-DPDCH, E-DPCCH and HS-DPCCH relative to DPCCH are respectively $β_c$, $β_{ed}$, $β_{ec}$ and $β_{hs}$, which are linear, non-negative real values.

Figure 12:
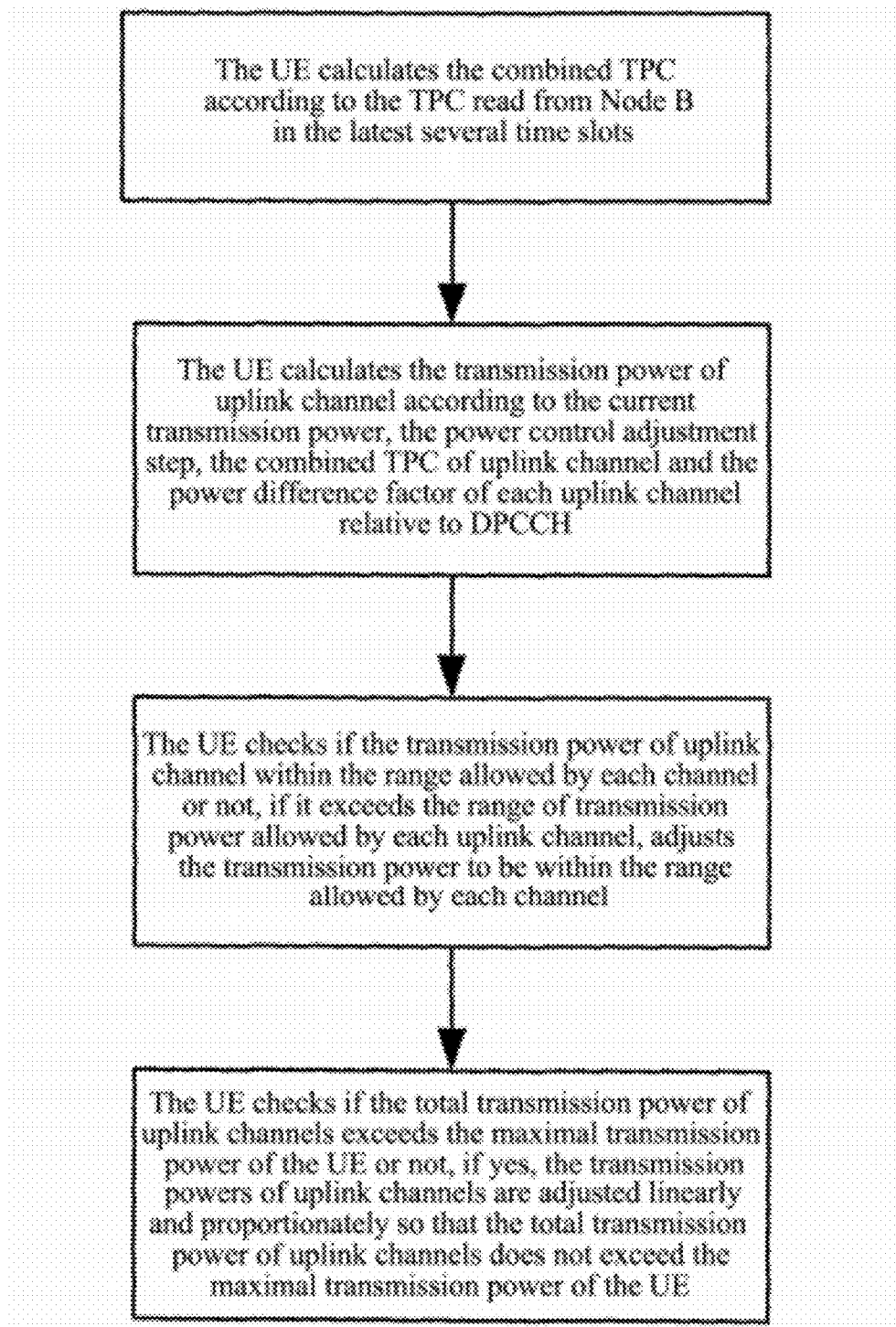
FIG. 12 illustrates schematically the flow of calculating and adjusting the uplink channel transmission power in accordance with an embodiment the method of the present invention.

Where, the flow of calculating and adjusting the transmission power of uplink channel used in the next TTI is shown in FIG. 12, which includes the following 4 sub-steps:

Sub-step 41: Said UE calculates the combined transmission power control command $TPC_{Adj}$ according to the TPC from Node B in the latest several time slots;

Sub-step 42: Said UE calculates the transmission power of the uplink channel according to the current transmission powers of the uplink PDPCCH, PE_DPDCH, PE_DPCCH and PHS_DPCCH, the power control adjustment step Δ, the combined transmission power control command $TPC_{Adj}$ of the uplink and the power offset factor β of each uplink channel relative to DPCCH;

Sub-step 43: The UE checks whether the transmission power of said uplink channel is in the range allowed by each channel, that is, it meets the requirement of the minimal transmission power of each channel and meanwhile does not exceed the maximal transmission power of each channel; if it exceeds the range of transmission power allowed by each channel, the UE will adjust the transmission power to be within the range allowed by each channel;

Sub-step 44: Said UE checks whether the total transmission power of uplink channels exceeds the maximal transmission power of the UE or not; if yes, it adjusts the transmission powers of uplink channel proportionately so that the total transmission power of uplink channels does not exceed the maximal transmission power of the UE.

Step 5: The UE keeps the transmission powers of all or some uplink channels in the whole TTI of E-DPDCH constant, and the whole flow ends.

The First Embodiment

In this embodiment, assume that the UE has no uplink DPDCH or Physical Random Access Channel (PRACH), while the UE has the following uplink channels: DPCCH, E-DPDCH, E-DPCCH and HS-DPCCH, and supports 3GPP Release 7 or later.

Step 101: the UE reads TPC from Node B in the latest three time slots, the current transmission power of uplink channel and the modulation of E-DPDCH in next TTI.

Where, the TPC might come from DPCCH or F-DPCH sent by Node B. Suppose the TPC in the latest $1^{st}$ time slot is TPC1, the TPC in the latest $2^{nd}$ time slot is TPC2 and that in the latest $3^{rd}$ time slot is TPC3. The value range of TPC1, TPC2 and TPC3 is the set of {0, 1}, that is, either "0" or "1".

The current transmission power of DPCCH, E-DPDCH, E-DPCCH and HS-DPCCH are respectively $P_{DPCCH}$, $P_{E\_DPDCH}$, $P_{E\_DPCCH}$ and $P_{HS\_DPCCH}$ whose values are linear, with a unit of mW, the value range is from 0 to the maximal transmission power of the UE. The maximal transmission power of the UE is generally 125 mW (21 dBm) or 250 mW (24 dBm), and the below is the same.

The modulation of E-DPDCH in next TTI is BPSK, 4PAM or higher order modulation (such as 8PAM).

Step 102: The UE selects the method for power control according to the modulation of E-DPDCH, if it is BPSK, the process proceeds to step 103; otherwise, the process proceeds to step 104.

Step 103: Since the UE supports 3GPP Release 7 or higher version, the process proceeds to step 104.

Step 104: Said UE calculates and adjusts the transmission power of uplink channel used in the next TTI according to the TPC received in the latest three time slots, the current transmission power, the requirements of maximal transmission power and minimal transmission power, the power control adjustment step and the power offset factor β related to DPCCH of uplink channel.

The above-mentioned TPC comes from TPC1, TPC2 and TPC3 in step 101.

The above-mentioned current transmission powers of uplink DPCCH, E-DPDCH, E-DPCCH and HS-DPCCH come from $P_{DPCCH}$, $P_{E\_DPDCH}$, $P_{E\_DPCCH}$ and $P_{HS\_DPCCH}$ in step 1.

The maximal transmission powers of DPCCH, E-DPDCH, E-DPCCH and HS-DPCCH are respectively $MaxP_{DPCCH}$, $MaxP_{E\_DPDCH}$, $MaxP_{E\_DPCCH}$ and $MaxP_{HS\_DPCCH}$, whose values are linear, with a unit of mW, the value range is from 0 to the maximal transmission power of the UE.

The minimal transmission powers of DPCCH, E-DPDCH, E-DPCCH and HS-DPCCH are respectively $MinP_{DPCCH}$, $MinP_{E\_DPDCH}$, $MinP_{E\_DPCCH}$ and $MinP_{HS\_DPCCH}$, whose values are linear, with a unit of mW, and the value range is from 0 to the maximal transmission power of the UE.

The above-mentioned power control adjustment step is $\Delta$ in dB, log domain, and the below is the same.

The above-mentioned power offset factors $\beta$ of uplink DPCCH, E-DPDCH, E-DPCCH and HS-DPCCH related to DPCCH are respectively $\beta_c$, $\beta_{ed}$, $\beta_{ec}$ and $\beta_{hs}$, the values of all these factors are linear, non-negative, and real.

The above-mentioned flow of calculating and adjusting the transmission powers of uplink DPCCH, E-DPDCH, E-DPCCH and HS-DPCCH used in the next TTI is shown as the following 4 sub-steps:

Sub-step 1041: Said UE calculates the combined transmission power control command $TPC_{Adj}$ according to the TPC1, TPC2 and TPC3 read from Node B in the latest three time slots. The method is shown as Eqn. 1, Eqn. 2 and Eqn. 3.

$$TPC_{Com} = TPC1 + TPC2 + TPC3 \quad \text{(Eqn. 1)}$$

$$TPC_{Dec} = \begin{cases} 0, & \text{if } TPC_{Com} < 2 \\ 1, & \text{else} \end{cases} \quad \text{(Eqn. 2)}$$

$$TPC_{Adj} = 2 \cdot TPC_{Dec} - 1 \quad \text{(Eqn. 3)}$$

Sub-step 1042: Said UE calculates the transmission power of uplink DPCCH, E-DPDCH, E-DPCCH and HS-DPCCH. The method is shown as the following Eqn. 4, Eqn. 5, Eqn. 6 and Eqn. 7.

$$AdjP_{DPCCH} = 10^{0.1 \cdot \Delta \cdot TPC_{Adj}} \cdot P_{DPCCH} \quad \text{(Eqn. 4)}$$

$$P_{E\_DPDCH} = \left(\frac{\beta_{ed}}{\beta_c}\right)^2 \cdot AdjP_{DPCCH} \quad \text{(Eqn. 5)}$$

$$P_{E\_DPCCH} = \left(\frac{\beta_{ec}}{\beta_c}\right)^2 \cdot AdjP_{DPCCH} \quad \text{(Eqn. 6)}$$

$$P_{HS\_DPCCH} = \left(\frac{\beta_{hs}}{\beta_c}\right)^2 \cdot AdjP_{DPCCH} \quad \text{(Eqn. 7)}$$

From Eqn. 5, Eqn. 6 and Eqn. 7, there is:

$$P_{other} = \left(\frac{\beta_{other}}{\beta_c}\right)^2 \cdot AdjP_{DPCCH} \quad \text{(Eqn. 8)}$$

wherein, the $P_{other}$ in Eqn. 8 is the transmission power of each uplink channel except this DPCCH; $\beta_c$ and $\beta_{other}$ respectively are the power different factor of DPCCH and the power different factor of other uplink channel relative to DPCCH, for example, $\beta_{ed}$ Eqn. 5 is the power offset factor of E-DPDCH relative to DPCCH; $\beta_{ec}$ in Eqn. 6 is the power offset factor of E-DPCCH relative to DPCCH; $\beta_{hs}$ in Eqn. 7 is the power offset factor of HS-DPCCH relative to DPCCH.

The current transmission power of DPCCH, E-DPDCH and HS-DPCCH come from the $P_{DPCCH}$, $P_{E\_DPDCH}$, $P_{E\_DPCCH}$ and $P_{HS\_DPCCH}$ in step 101.

Sub-step 1043: The UE checks whether the transmission power of DPCCH, E-DPDCH, E-DPCCH and HS-DPCCH are in the range allowed by each channel or not, that is, the transmission power meets requirement of the minimal transmission power by each channel and meanwhile does not exceed the maximal transmission power of each channel; if it exceeds the range of transmission power allowed by each channel, the UE will adjust the transmission powers of uplink DPCCH, E-DPDCH, E-DPCCH and HS-DPCCH to be within the range allowed by each channel;

Sub-step 1044: Said UE checks if the total transmission power of uplink DPCCH, E-DPDCH, E-DPCCH and HS-DPCCH exceeds the maximal transmission power of the UE or not; if yes, the transmission powers of DPCCH, E-DPDCH, E-DPCCH and HS-DPCCH are adjusted linearly and proportionately so that the total transmission power of DPCCH, E-DPDCH, E-DPCCH and HS-DPCCH does not exceed the maximal transmission power of the UE.

Step 105: The UE keeps the transmission powers of DPCCH, E-DPDCH and HS-DPCCH in the whole TTI of E-DPDCH constant, and then the whole procedure ends.

The Second Embodiment

In this embodiment, assume that the UE has no uplink DPDCH or Physical Random Access Channel (PRACH), and meanwhile has the following uplink channels: DPCCH, E-DPDCH, E-DPCCH and HS-DPCCH, and the modulation of E-DPDCH is 4PAM (I/Q multiplexing to be equivalent to 16QAM) in the next TTI.

Step 201: the UE reads TPC from Node B in the latest two time slots, the current transmission power of uplink channel and the modulation of E-DPDCH in next TTI.

The above-mentioned TPC might come from DPCCH or F-DPCH sent by Node B. Suppose the TPC in the latest $1^{st}$ time slot is TPC1 and the TPC in the latest $2^{nd}$ is TPC2. The value range of TPC1 and TPC2 is the set of $\{0, 1\}$, that is, either "0" or "1".

The current transmission powers of DPCCH, E-DPDCH, E-DPCCH and HS-DPCCH are respectively $P_{DPCCH}$, $P_{E\_DPDCH}$, $P_{E\_DPCCH}$ and $P_{HS\_DPCCH}$, whose values are linear with unit of mW, the value range is from 0 to the maximal transmission power of the UE. The maximal transmission power of the UE is generally 125 mW (21 dBm) or 250 mW (24 dBm), and the below is the same.

The modulation of E-DPDCH in next TTI is 4PAM or higher order modulation (such as 8PAM) according to the assumption of the present embodiment.

Step 202: The UE selects a method for power control according to the modulation of E-DPDCH in the next TTI. Since the modulation is 4PAM or 8PAM, the procedure proceeds to step 204;

Step 203: Nop (Void. No operation)

Step 204: Said UE calculates and adjusts the transmission power of uplink channel used in the next TTI according to the TPC received in the latest two time slots, the current transmission power, the requirements of maximal transmission power and minimal transmission power, the power control adjustment step and the power offset factor $\beta$ relative to DPCCH of the uplink channel.

The above-mentioned TPC comes from TPC1 and TPC2 in step 201.

The above-mentioned current transmission powers of uplink DPCCH, E-DPDCH, E-DPCCH and HS-DPCCH come from $P_{DPCCH}$, $P_{E\_DPDCH}$, $P_{E\_DPCCH}$ and $P_{HS\_DPCCH}$ in step 201.

The maximal transmission powers of DPCCH, E-DPDCH, E-DPCCH and HS-DPCCH are respectively $MaxP_{DPCCH}$, $MaxP_{E\_DPDCH}$, $MaxP_{E\_DPCCH}$ and $MaxP_{HS\_DPCCH}$, whose values are linear, with a unit of mW, the value range is from 0 to the maximal transmission power of the UE.

The minimal transmission powers of uplink DPCCH, E-DPDCH and HS-DPCCH are respectively $MinP_{DPCCH}$, $MinP_{E\_DPDCH}$, $MinP_{E\_DPCCH}$ and $MinP_{HS\_DPCCH}$, whose values are linear, with a unit of mW, and the value range is from 0 to the maximal transmission power of the UE.

The above-mentioned power control adjustment step is $\Delta$ in dB, log domain, same below.

The above-mentioned power offset factors $\beta$ of uplink DPCCH, E-DPDCH, E-DPCCH and HS-DPCCH relative to DPCCH are respectively $\beta_c$, $\beta_{ed}$, $\beta_{ec}$ and $\beta_{hs}$, which are linear, non-negative real values.

The above-mentioned flow of calculating and adjusting the transmission powers of uplink DPCCH, E-DPDCH, E-DPCCH and HS-DPCCH used in the next TTI is shown as the following 4 sub-steps:

Sub-step 2041: Said UE calculates the combined transmission power control command $TPC_{Adj}$ according to the TPC1 and TPC2 read from Node B in the latest two time slots. The method is shown as Eqn. 9.

$$TPC_{Adj} = TPC1 + TPC2 - 1 \quad \text{(Eqn. 9)}$$

Sub-step 2042: Said UE calculates the transmission powers of uplink DPCCH, E-DPDCH, E-DPCCH and HS-DPCCH. The method is shown as Eqn. 4, Eqn. 5, Eqn 6 and Eqn. 7 in the first embodiment.

Sub-step 2043: The UE checks if the transmission powers of DPCCH, E-DPDCH, E-DPCCH and HS-DPCCH are in the range allowed by each channel, that is, the transmission power meets requirement of minimal transmission power by each channel and meanwhile does not exceed the maximal transmission power of each channel; if it exceeds the range of transmission power allowed by each channel, the UE will adjust the transmission powers of DPCCH, E-DPDCH, E-DPCCH and HS-DPCCH to be within the range allowed by each channel;

Sub-step 2044: Said UE checks if the total transmission power of DPCCH, E-DPDCH, E-DPCCH and HS-DPCCH exceeds the maximal transmission power of the UE or not; if yes, the transmission powers of DPCCH, E-DPDCH, E-DPCCH and HS-DPCCH are adjusted linearly and proportionately so that the total transmission power of DPCCH, E-DPDCH, E-DPCCH and HS-DPCCH does not exceed the maximal transmission power of the UE.

Step 205: The UE keeps the transmission powers of DPCCH, E-DPDCH and HS-DPCCH in the whole TTI of E-DPDCH constant, and then the whole process ends.

The principle of the device and method in accordance with the present invention has been described in detail, but the embodiments are used for better understanding and not intended to limit the scope of the present invention. Meanwhile, equivalent modifications and varieties can be made based on the description of the technical scheme of the present invention and its embodiments, and these equivalent modifications and varieties should fall into the scope of the claims of the present invention.

INDUSTRIAL APPLICABILITY

The uplink power control device and method in accordance with the present invention can be used for power control technology in WCDMA mobile communication system, especially the power control of E-DCH in HSPA+. The present invention reduces the crosstalk between I branch signals and Q branch signals to make HSPA+ system better support 4PAM (I/Q multiplexing to be equivalent to 16QAM) or higher order modulation (such as 8PAM), be compatible with and enhance the present HSUPA technology.

The invention claimed is:

1. An uplink power control method in a High Speed Packet Access Evolution system, comprising:
   (1) reading, with User Equipment, a modulation scheme of an Enhanced Dedicated Physical Data Channel in a Transmission Time Interval;
   (2) selecting, with the User Equipment a method for power control for data transmission according to the modulation scheme of Enhanced Dedicated Physical Data Channel, wherein if the modulation scheme is Binary Phase Shift Keying, the method proceeds to step (3); otherwise, if the modulation scheme is 4 Pulse-Amplitude Modulation, 8 Pulse-Amplitude Modulation or higher order modulation, the method proceeds to step (4);
   (3) selecting, with the User Equipment, a power control algorithm in response to determining a 3GPP version supported by the User Equipment, wherein if the User Equipment supports 3GPP, supports High Speed Uplink Packet Access ("HSUPA"), and supports one or more of 16-order Quadrature Amplitude Modulation ("16QAM"), 32QAM, and 64QAM, the method proceeds to step (4); otherwise, transmission power is controlled according to the uplink power control method specified in the TS25.214 of 3GPP Release 99/5/6;
   (4) keeping, by way of the User Equipment, the transmission powers of one or more uplink channels in whole Transmission Time Interval of Enhanced Dedicated Physical Data Channel constant.

2. The method of claim 1, wherein in said step (1), reading a modulation scheme further comprises reading Transmission Power Control from Node B in a plurality of the most recent time slots and a current transmission power of uplink channel.

3. The method of claim 2, wherein, said Transmission Power Control includes Transmission Power Control from a Dedicated Physical Control Channel or a Fractional Dedicated Physical Channel sent by Node B.

4. The method of claim 2, wherein in said step (1), the range of said Transmission Power Control is a set of $\{0, 1\}$, wherein said Transmission Power Control may be set to a value of 0 or 1.

5. The method of claim 2, said step (4) further comprising calculating the transmission power of the uplink channel used in the next Transmission Time Interval according to the Transmission Power Control received in the plurality of the most recent time slots, the current transmission power, requirements for a maximal transmission power and a minimal transmission power, a power control adjustment step, and a power offset factor $\beta$ relative to Dedicated Physical Control Channel of uplink channel, wherein the method keeps the transmission powers of the one or more uplink channels constant.

6. The method of claim 5, wherein said step (4) comprises:
   (4-1) calculating, with the User Equipment, a combined transmission power control command $TPC_{Adj}$ according to the Transmission Power Control read from Node B in the plurality of the most recent time slots;
   (4-2) calculating, with the User Equipment, the transmission power of an uplink channel according to the current transmission power, the power control adjustment step Δ, the combined transmission power control command $TPC_{Adj}$ of uplink channel and the power offset factor β of uplink channel relative to Dedicated Physical Control Channel;

(4-3) checking, with the User Equipment, if the transmission power of uplink channel is in a range allowed by each channel by determining if the transmission power of uplink channel meets requirements of minimal transmission power by each channel and does not exceed the maximal transmission power of each channel and further comprising adjusting the transmission power to be within a range allowed by each channel in response to determining that the transmit power of an uplink channel exceeds the range of transmission power allowed by the channel;

(4-4) checking, with the User Equipment, if the total transmission power of the one or more uplink channels exceeds the maximal transmission power of the User Equipment and, in response to determining that the total transmission power exceeds the maximal transmission power of the User Equipment, adjusting the transmission powers of the one or more uplink channels so that the total transmission power of uplink channels does not exceed the maximal transmission power of the User Equipment.

7. The method of claim 6, wherein in said step (4-1), in response to determining that the User Equipment supports a 3GPP, supports High Speed Uplink Packet Access ("HSUPA"), and supports one or more of 16-order Quadrature Amplitude Modulation ("16QAM"), 32QAM, and 64QAM, further comprising calculating the combined transmission power control command $TPC_{Adj}$ according to the following equations:

$$TPC_{Com} = TPC1 + TPC2 + TPC3 + \ldots + TPCn \quad \text{(Eqn. A)}$$

$$TPC_{Dec} = \begin{cases} 0, & \text{if } TPC_{Com} < 2 \\ 1, & \text{else} \end{cases} \quad \text{(Eqn. B)}$$

$$TPC_{Adj} = 2 \cdot TPC_{Dec} - 1 \quad \text{(Eqn. C)}$$

wherein, said TPC1, TPC2, TPC3, ..., TPCn are respectively the TPC commands in the most recent n time slots.

8. The method of claim 6, wherein in said step (4-1), if the modulation scheme of Enhanced Dedicated Physical Data Channel in the next Transmission Time Interval is 4 Pulse-Amplitude Modulation, 8 Pulse-Amplitude Modulation or a higher order modulation, further comprising calculating the combined transmission power control command $TPC_{Adj}$ according to the following equation:

$$TPC_{Adj} = TPC1 + TPC2 + \ldots + TPCn - 1 \quad \text{(Eqn. D)}$$

wherein, said TPC1, TPC2, TPC3, ..., TPCn are respectively the TPC commands in the most recent n time slots.

9. The method of claim 7, wherein in said step (4-2), the transmission power of the uplink channel is calculated according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein $P_{DPCCH}$ in Eqn. E is the current transmission power of Dedicated Physical Control Channel, Δ is the power control adjustment step; $P_{other}$ in Eqn. F is the transmission power of one or more uplink channels other than the Dedicated Physical Control Channel, $\beta_c$ and $\beta_{other}$ are respectively a power offset factor of the Dedicated Physical Control Channel and the power offset factor of the uplink channels other than the the Dedicated Physical Control Channel relative to the Dedicated Physical Control Channel.

10. The method of claim 6, wherein in said step (4-4), adjusting the transmission power comprises adjusting the transmission power of uplink channel linearly and proportionately.

11. The method of claim 3, wherein in said step (1), the range of said Transmission Power Control is a set of {0, 1}, wherein said Transmission Power Control may be set to a value of 0 or 1.

12. The method of claim 8, wherein in said step (4-2), the transmission power of the uplink channel is calculated according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein $P_{DPCCH}$ in Eqn. E is the current transmission power of the Dedicated Physical Control Channel, Δ is the power control adjustment step; $P_{other}$ in Eqn. F is the transmission power of one or more uplink channels other than the Dedicated Physical Control Channel, $\beta_c$ and $\beta_{other}$ are respectively a power offset factor of the Dedicated Physical Control Channel and the power offset factor of the uplink channels other than the Dedicated Physical Control Channel relative to the Dedicated Physical Control Channel.

13. An uplink power control device in a High Speed Packet Access Evolution system, the device comprising a processor, the device comprising:

a Transmission Power Control reading module that reads Transmission Power Control ("TPC") from Node B in a plurality of the most recent time slots;

a current transmission power reading module that reads the current transmission power of an uplink channel of User Equipment;

an Enhanced Dedicated Physical Data Channel modulation scheme reading module that reads a modulation scheme of Enhanced Dedicated Physical Data Channel in the next Transmission Time Interval;

a 3GPP release reading module that reads a 3GPP release supported by the User Equipment;

a maximum and minimum reading module that reads requirements of a maximal transmission power and a minimal transmission power, a power control step and a power offset factor β relative to a Dedicated Physical Control Channel of an uplink channel;

an uplink channel transmission power calculation module that calculates the transmission power of each uplink channel according to the read TPC, the current transmission power, the requirements of the maximal transmit power and the minimal transmission power, the power control adjustment step and the power offset factor β relative to the Dedicated Physical Control Channel of the uplink channel; and an uplink channel transmission power setting module that checks the transmission power of each uplink channel and adjusts the transmission power exceeding a range allowed by each channel to be within the range, checks a total transmission power of the uplink channels, and linearly adjusts the transmission power of each uplink channel if the total transmission power of uplink channels exceeds the maximal transmission power of the user equipment.

14. The device of claim 13, wherein the Transmission Power Control reading module reads Transmission Power Control from a Dedicated Physical Control Channel or a Fractional Dedicated Physical Channel sent by Node B.

15. The device of claim 13, wherein in response to determining that the User Equipment supports a 3GPP, supports High Speed Uplink Packet Access ("HSUPA"), and supports one or more of 16-order Quadrature Amplitude Modulation ("16QAM"), 32QAM, and 64QAM, the uplink channel transmission power calculation module calculates a combined transmission power control command $TPC_{Adj}$ according to the following equations:

$$TPC_{Com} = TPC1 + TPC2 + TPC3 + \ldots + TPCn \quad \text{(Eqn. A)}$$

$$TPC_{Dec} = \begin{cases} 0, & \text{if } TPC_{Com} < 2 \\ 1, & \text{else} \end{cases} \quad \text{(Eqn. B)}$$

$$TPC_{Adj} = 2 \cdot TPC_{Dec} - 1 \quad \text{(Eqn. C)}$$

wherein, said TPC1, TPC2, TPC3, ..., TPCn are respectively the Transmission Power Control commands in the most recent n time slots.

16. The device of claim 13, wherein if the modulation scheme of the Enhanced Dedicated Physical Data Channel is 4 Pulse-Amplitude Modulation, 8 Pulse-Amplitude Modulation or a higher order modulation in the next Transmission Time Interval, said uplink channel transmission power module calculates the combined transmission power control command $TPC_{Adj}$ according to the following equation:

$$TPC_{Adj}=TPC1+TPC2+,\ldots,+TPCn-1\text{tm} \quad \text{(Eqn. D)}$$

wherein, said TPC1, TPC2, TPC3, ..., TPCn are respectively the Transmission Power Control commands in the most recent n time slots.

17. The device of claim 15, wherein the uplink channel transmission power module calculates the transmission power of uplink channel according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein $P_{DPCCH}$ in Eqn. E is the current transmission power of the Dedicated Physical Control Channel, $\Delta$ is the power control adjustment step; $P_{other}$ in Eqn. F is the transmission power of one or more uplink channels other than the Dedicated Physical Control Channel, $\beta_c$ and $\beta_{other}$ are respectively a power offset factor of the Dedicated Physical Control Channel and the power offset factor of the uplink channels other than the Dedicated Physical Control Channel relative to the Dedicated Physical Control Channel.

18. The device of claim 16, wherein the uplink channel transmission power calculation module calculates the transmission power of uplink channel according to the following equations:

$$AdjP_{DPCCH} = 10^{0.1 \cdot \Delta \cdot TPC_{Adj}} \cdot P_{DPCCH} \quad \text{(Eqn. E)}$$

$$P_{other} = \left(\frac{\beta_{other}}{\beta_c}\right)^2 \cdot AdjP_{DPCCH} \quad \text{(Eqn. F)}$$

wherein $P_{DPCCH}$ in Eqn. E is the current transmission power of the Dedicated Physical Control Channel, $\Delta$ is the power control adjustment step; $P_{other}$ in Eqn. F is the transmission power of one or more uplink channels other than the Dedicated Physical Control Channel, $\beta_c$ and $\beta_{other}$ are respectively a power offset factor of the Dedicated Physical Control Channel and the power offset factor of the uplink channels other than the Dedicated Physical Control Channel relative to the Dedicated Physical Control Channel.

* * * * *